Nov. 22, 1949  J. J. BLACK  2,489,117
BRAKING SYSTEM FOR TRACTOR-TRAILER COMBINATION
Filed July 8, 1946  3 Sheets-Sheet 1

INVENTOR.
James J. Black
BY
ATTORNEYS

Nov. 22, 1949    J. J. BLACK    2,489,117
BRAKING SYSTEM FOR TRACTOR-TRAILER COMBINATION
Filed July 8, 1946    3 Sheets-Sheet 2

INVENTOR.
James J. Black
BY
Wood, Arey, Herron & Evans
ATTORNEYS

Nov. 22, 1949  J. J. BLACK  2,489,117
BRAKING SYSTEM FOR TRACTOR-TRAILER COMBINATION
Filed July 8, 1946  3 Sheets-Sheet 3
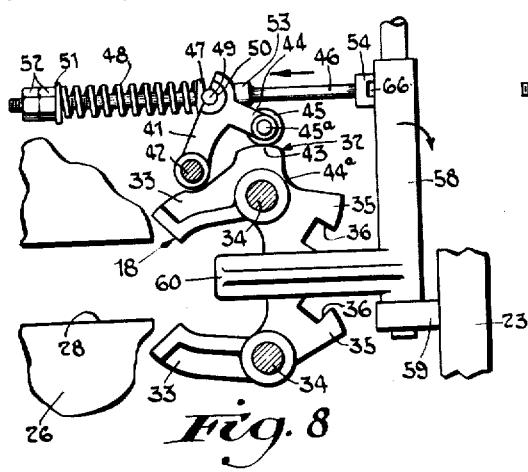
Fig. 8
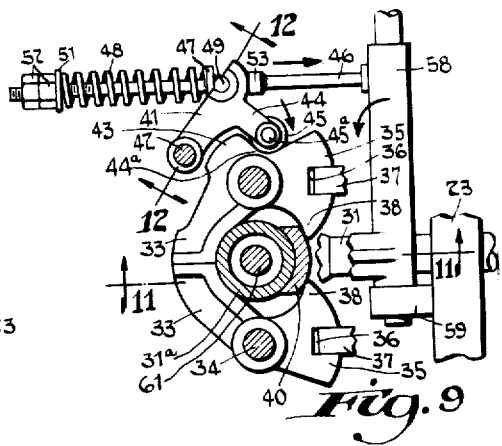
Fig. 9
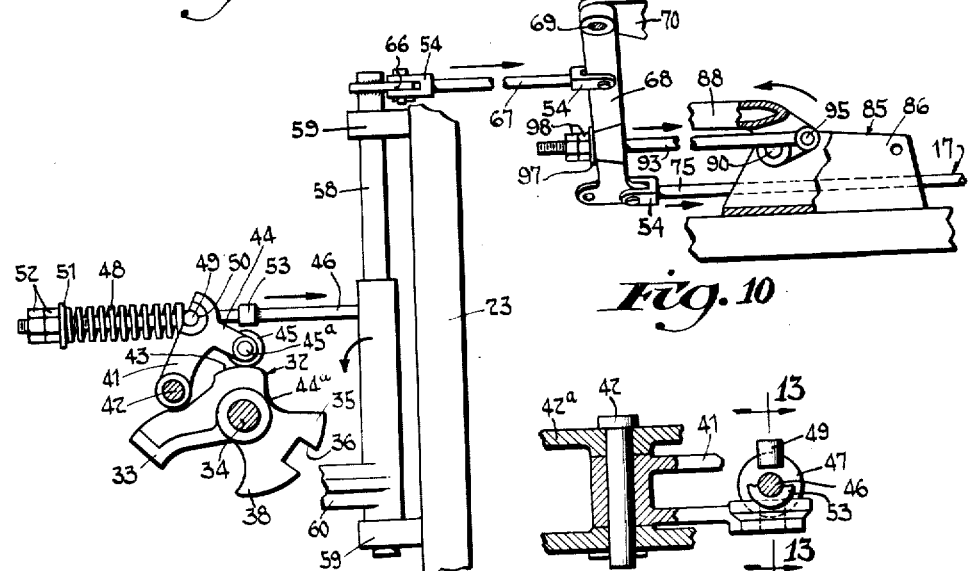
Fig. 10
Fig. 12
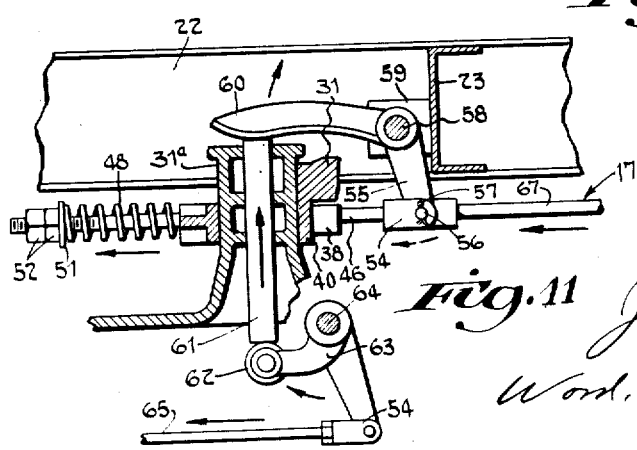
Fig. 11
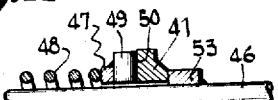
Fig. 13
INVENTOR.
James J. Black
BY
Wood, Arey, Herron & Evans
ATTORNEYS Patented Nov. 22, 1949

2,489,117

UNITED STATES PATENT OFFICE 2,489,117

BRAKING SYSTEM FOR TRACTOR-TRAILER COMBINATIONS

James J. Black, Cincinnati, Ohio, assignor to The Trailmobile Company, Cincinnati, Ohio, a corporation of Delaware Application July 8, 1946, Serial No. 681,880

15 Claims. (Cl. 280—33.05)

This invention relates to semi-trailers and has particular reference to an improved brake control system which functions automatically to set the brakes when the trailer is uncoupled from the tractor and to release them when it is recoupled.

More specifically the invention embraces a single brake system adapted alternatively to be actuated by the tractor service brake system when the vehicles are coupled, and to be actuated automatically by mechanism interconnected with the coupling mechanism, to set the brakes when the vehicles are uncoupled. The organization further incorporates an auxiliary, manually operated brake release mechanism which permits the brakes to be released when the trailer is uncoupled and parked.

Semi-trailers of the type to which the invention is applied are provided with a set of wheels at the rear which conventionally include brake mechanism adapted to be coupled to the tractor service brake system when the vehicles are coupled together.

In coupled relationship the forward end of the trailer rests upon the tractor fifth wheel, and in the present instance is coupled by engagement of the coupling jaws of the trailer with a king pin carried by the tractor. Means is associated with king pin, and is arranged to be actuated by the service brake system of the tractor, thus establishing a connection between the tractor and trailer to apply the trailer brakes by the normal operation of the service brake pedal in the tractor cab.

When the trailer is uncoupled, its forward end rests upon a prop provided for this purpose, the prop including wheels upon which the load is supported. However, in uncoupled position the braking connection with the tractor normally is broken and the trailer brakes therefore released. This is undesirable and sometimes dangerous since the vehicle may be parked on a hill or slope and caused to roll by gravity. Also in backing the tractor into coupling engagement with the trailer there is a tendency for the tractor to push the trailer rearwardly thus hampering the coupling of the vehicles.

It will therefore be apparent that the improved parking brake system provides not only a safety device for the uncoupled trailer but additionally expedites coupling by preventing backward rolling of the trailer during coupling motion of the tractor.

An embodiment of the invention may include the provision of a coupling jaw including a cam and lever, the lever connected through a compression spring to the service brake linkage to set the brakes when the jaw is in uncoupled position. The brakes are releasable by retracting the brake linkage against the compression force of the spring by manual actuation of a release lever provided for this purpose. The combined apparatus has three primary functions, namely, to set the brakes automatically when the trailer is uncoupled, to release the brakes when it is recoupled, and to permit manual release of the brakes if necessary when the trailer is uncoupled.

The compression spring interposed in the mechanism eliminates the use of a manually operated expansible or openable link sometimes employed for manual brake release in installations employing a direct mechanical connection from the coupler to the brakes. Such arrangements when actuated, in effect, lengthen the brake linkage for release, but are undesirable since they introduce looseness in the brake system, cause dragging, friction and reduction in the braking pressure transmitted to the pull rods, and sometimes lead to brake failures.

In the present instance the introduction of the spring in the brake linkage, in effect, lengthens the linkage for release when the hand lever is actuated, by compressing the spring. The manual release apparatus is operable to retract the brake linkage when the trailer is parked by compressing the spring through which the coupler jaw cam exerts its parking brake pressure. Therefore, by manual operation of this lever the brakes can be released permitting the trailer to be moved, if necessary, when it is uncoupled.

The compression spring determines maximum brake set and by reason of its compression compensates for brake wear. This avoids the necessity of frequent adjustment and moreover prevents brake slippage as sometimes occurs due to contraction of the drums and associated mechanism due to cooling when the trailer is uncoupled and parked after a trip. The release apparatus is auxiliary to the brake system and has no connection with the system when it is in normal inoperative position and therefore does not in any way interfere with normal service or parking brake operation.

It has been an object of the inventor therefore to provide an improved brake control system for semi-trailers which automatically sets the brakes when the trailer is uncoupled from a tractor and automatically releases the brakes when it is recoupled.

It has been another object to provide a brake system interconnected with the coupling mechanism of a trailer for automatically setting the brakes upon uncoupling, the braking force being transmitted through a compression spring which permits the brakes to be released manually by actuation of a hand operated release mechanism which compresses the spring and retracts the brake linkage.

It has been a further object to provide a manual release apparatus which normally forms no part of the brake system and does not interfere with or effect the power transmitted to the brakes by the parking or service brake linkage movement.

A further object has been to provide a parking brake system having a compression spring interposed in the mechanism to control the maximum set of the brakes and thereby compensate for the brake wear, prevent loosening of the brakes after parking and reduce the frequency of adjustment as required by brake wear.

Further objects and advantages of the invention will be more fully set forth in the description with reference to the accompanying drawings illustrating a preferred embodiment of the invention in which:

Figure 8 is an enlarged fragmentary plan view showing the coupling jaws in uncoupled position and the cam operated brake linkage in braking position as in Figure 1.

Figure 9 is a fragmentary view similar to Figure 8 showing the jaws in coupled position with a king pin and the end of a prop actuating rod engaged therein and with the brake linkage in brake release position.

Figure 10 is a fragmentary diagrammatic view illustrating the coupling jaw and parking brake mechanism, the coupling jaw shown in open position similar to Figure 8 with the parking brakes released by operation of the manual release lever.

Figure 11 is a fragmentary sectional view showing a king pin engaged in the coupling jaws and illustrating the connection of the tractor service brakes with the braking system of the trailer.

Figure 12 is a sectional view taken on line 12—12, Figure 9, detailing the construction of the cam actuated parking brake actuating lever.

Figure 13 is a sectional view taken on line 13—13, Figure 12.

Figure 1:
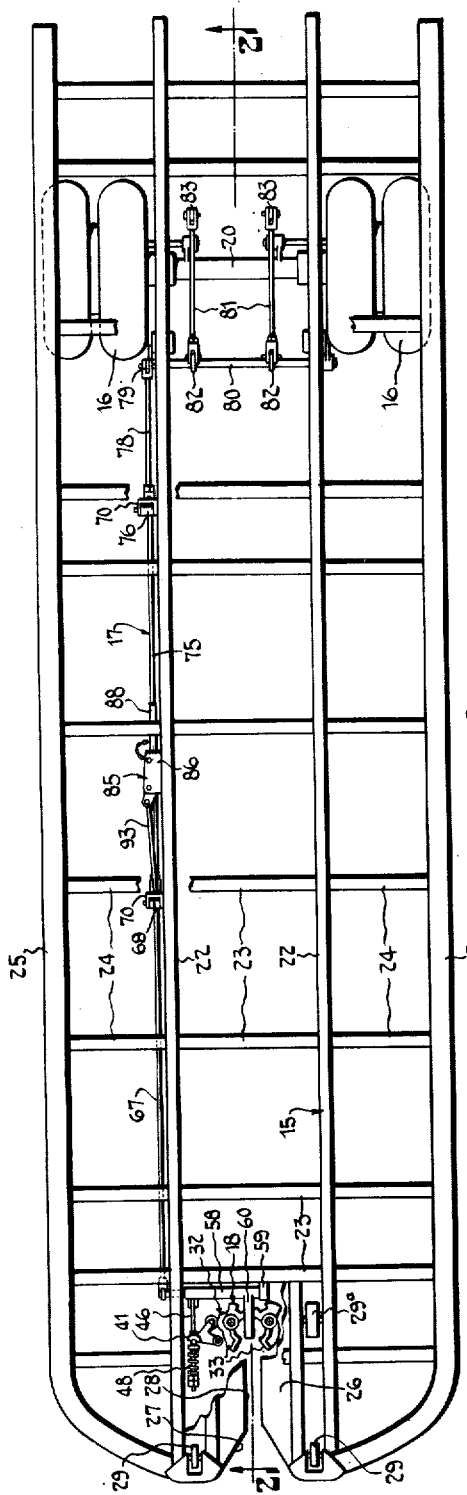
Figure 1 is a top plan view of a semi-trailer chassis generally illustrating the construction and arrangement of the lower fifth wheel, coupling mechanism and brake operating linkage, the trailer being shown disconnected from a tractor with the parking brakes automatically applied by the interconnected coupling jaw and brake mechanism.

Referring to Figure 1, illustrating a trailer, the chassis is indicated generally at 15 and includes a pair of wheels 16 preferably in dual arrangement as shown. The wheels include the usual brake mechanism which may be of standard design, either mechanically or hydraulically operated. In the present instance a mechanically operated brake mechanism is illustrated.

Figure 2:
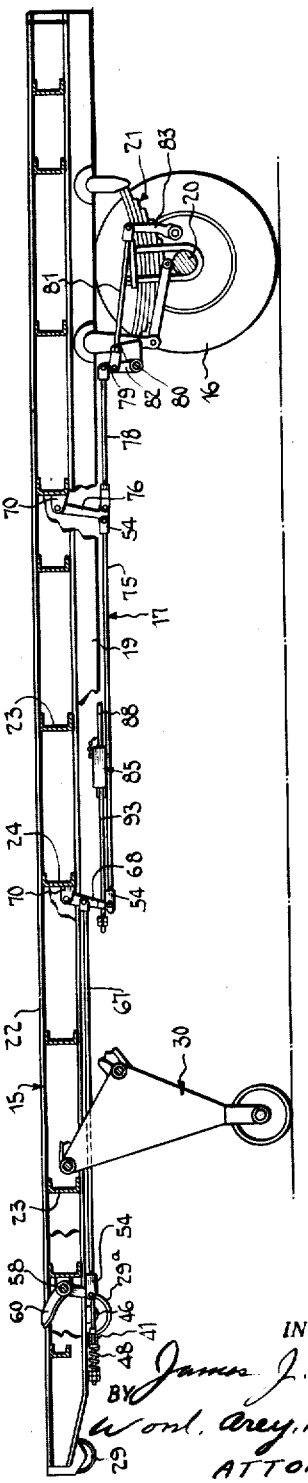
Figure 2 is a longitudinal section taken on the line 2—2 of Figure 1.

The brakes are connected, by means of linkage 17, to the coupling mechanism 18 located at the forward end of the trailer. As shown in Figure 2, the chassis includes a sub-frame generally indicated at 19 supported by the wheels 16. The wheels are mounted upon an axle 20, the subframe being supported upon the axle by means of a spring and shackle assembly 21 in the usual manner.

The chassis 15 is constructed of longitudinal channel iron members 22, braced and reenforced by cross members 23. It further includes a frame upon which is mounted the floor and body of the trailer, the frame constituted by the longitudinal channel iron members 25 and cross members 24.

The forward end of the trailer includes a lower fifth wheel or guide plate 26 having a V-shaped slot 27 formed in its forward edge leading into a slot 26 which is in alignment with the coupling jaws disposed beneath the plate. The slot is designed to receive and guide the tractor king pin into position in the coupling jaws upon coupling the tractor to the trailer. A pair of rollers 29 is provided at the forward end of the trailer, disposed on opposite sides of the V-shaped slot 27. These rollers track upon a skid carried by the tractor to elevate the forward end of the trailer when it is coupled to the tractor. A second pair of rollers 29a located at each side of the coupling mechanism supports the trailer upon the tractor fifth wheel where the vehicles are fully coupled in draft connection.

Referring to Figure 2, the trailer chassis further includes a prop assembly indicated generally at 30. The prop supports the forward end of the trailer when it is uncoupled from the tractor and for this purpose is interconnected with the coupling mechanism which automatically raises and lowers it. The prop and its associated mechanism are actuated by a push rod 31 (see Figure 9), arranged to be moved rearwardly by engagement with the king pin 31a during coupling movement of the tractor. This rearward movement serves to retract the prop automatically when the vehicles are coupled, and conversely, permits the prop to lower when the vehicles are uncoupled.

As shown in Figure 8, the coupling mechanism substantially follows a standard commercial design as exemplified by Morrison's patent, No. 1,479,828. In the present instance, however, the right-hand jaw includes a cam lug generally indicated at 32 for automatic application of the trailer's parking brakes when the trailer is uncoupled from the tractor. The jaws 33 of the coupler are journaled respectively on pins 34—34 and secured in a bracket which serves as a casing for the assembly. Since the specific design of the coupling mechanism is not an essential part of the present invention, the various details of the coupler mechanism are omitted from the present disclosure.

The rearward portion of each jaw respectively includes a lug portion 35. Each lug portion has a notch 36 adapted to be engaged by a latch element 37 (see Figure 9). As shown, these latch elements enter the notches 36 when the jaws are in closed position thus latching the king pin in coupled position within the jaws. Each lug portion 35 further includes a spur 38 for engagement with the forward end of the prop as shown in Figure 9. Therefore the king pin 31a in coupled position is engaged between forward portions of the coupling jaws and the arcuate face of a block 40, forming the forward end of the push rod 31.

The parking brake linkage is interconnected with the coupling jaw 33 by means of an actuating lever 41 which is journaled upon a pin 42 engaged in the mounting bracket of the coupler mechanism, a portion of this bracket 42a being shown in Figure 12. The brake actuating lever includes a laterally extended arm portion 44 in which is journaled a roller 45 by means of a pin 45a. This roller is in engagement with the cam lug 32 of the coupling jaw 33 and, as shown in Figure 8, is engaged by the rise portion 43 of the cam. The lever 41, therefore, is swung forwardly on its pivot when the jaws are in open position. As shown in Figure 9, when the jaws are in closed or coupled position, the roller drops into the recessed portion 44a of the cam, thus permitting the lever 41 to swing rearwardly.

The actuating lever is of bifurcated construction, and its swinging end straddles a pull rod 46. The pull rod includes a trunnion collar 47 which is slidably disposed on the rod and engaged by a compression spring 48. The trunnion collar includes trunnion journals 49 seated in semi-circular bearings formed in the end of lever 41 causing the cam roller 45 to be pressed by spring pressure against the face of cam 32. The opposite end of the spring is seated upon a washer 51 engaged by a pair of adjusting nuts 52 screw-threaded on the end of the rod 46. The rod further includes a stop in the form of a collar 53 welded or otherwise secured thereon. The trunnion collar 47, therefore, is forced against the stop 53 by virtue of the compression force of the spring 48.

The rearward end of the pull rod 46 includes a clevis member 54 (Figure 11) preferably welded thereon and pivotally connected to a lever 55 by means of the clevis pin 56 locked in place by a cotter pin 57. This connection is typical of the numerous joints of the brake linkage and therefore is designated as 54 throughout this disclosure. The lever 55 is secured to a cross shaft 58, journaled in bearing blocks 59. These blocks are disposed at opposite ends of the shaft and are secured to one of the forward cross members 23 of the chassis. Rotation of the cross shaft 58 in the direction shown in Figure 8 actuates the brake linkage in the direction to apply braking pressure for parking as hereinafter described.

The inner end of the cross shaft includes a service brake actuating lever 60 which is arranged to be engaged and actuated by a thrust rod 61 slidably carried in a bore centrally of the king pin 31a (see Figure 11), the lower end of the rod being engaged by a roller 62 carried by lever 63 secured to a shaft 64. The lower end of the lever 63 is pivotally connected to a pull rod 65 which is connected to the brake pedal of the cab. When the service brakes are applied, the lever is swung in the direction indicated to elevate the thrust rod 61 and actuate lever 60 in an upward direction thereby rotating the cross shaft 58 in a direction to apply the brakes.

The end of the cross shaft 58 carries a lever 66 similar to lever 55 welded or otherwise secured to the end of the shaft. The lower end of this lever is pivotally connected to a pull rod 67, the rod including clevises 54 at its respectively opposite ends. The rearward end of the rod 67 is pivotally connected to a lever 68 having its upper end pivotally journaled as at 69 in a bracket 70 secured to one of the cross members 24 by welding or other means (see Figures 4 to 6 inclusive).

The lower end of the lever 68 is pivotally connected to a pull rod 75 which extends rearwardly as shown in Figure 2 and makes a pivotal connection with a lever 76, similar to lever 68 and likewise journaled in a bracket 70 secured to a cross member of the chassis. The lower end of the lever 76 is T-shaped to provide a pivotal connection respectively to the pull rod 75 and a pull rod 78. The rearward end of the rod 78 is pivotally connected to a lever 79 carried on a cross shaft 80 journalled at opposite ends on the shackle mounts of the trailer. A pair of pull rods 81 are connected to the shaft 80 by means of levers 82 secured to the shaft. The rearward ends of the rods 81 are pivotally connected respective to brake actuating levers 83, one for each set of dual wheels. Actuation of the lever 83 in the forward direction applies to the brakes.

It will be apparent that in the uncoupled position, as shown, the cam roller 45 of lever 41 is engaged by the rise portion of the cam, thereby rotating the cross shaft 58 in the braking direction, this motion being transmitted through the several pull rods and levers previously described to force the brake actuating lever in the braking position. It will be evident that the braking force is transmitted by the actuating lever 41 to the trunnion collar 47 and through the compression spring 48 which in turn is seated against the nuts 52 at the forward end of the rod. Therefore, should the cross shaft 58 be forced in the brake release direction, the compression spring 48 may be compressed to permit the brakes to be released while the vehicle is uncoupled and is parked.

Figure 4:
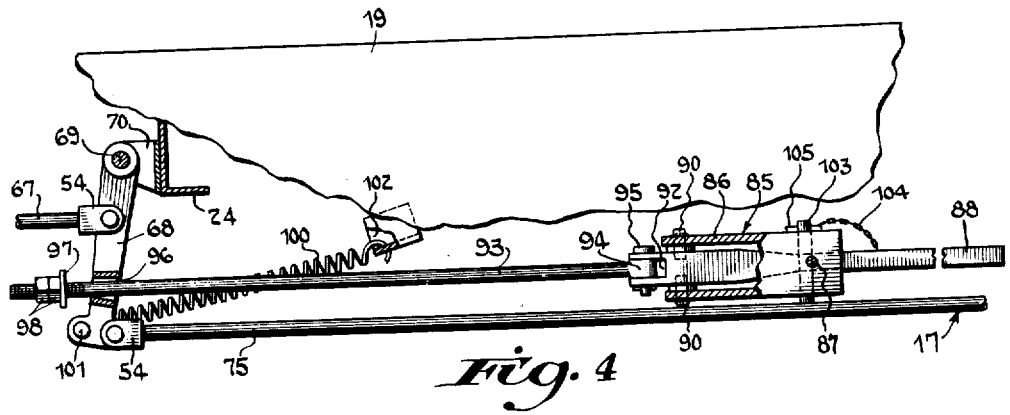
Figure 4 is an enlarged fragmentary side view of the mechanism shown in Figure 3.
Figures 5, 6:
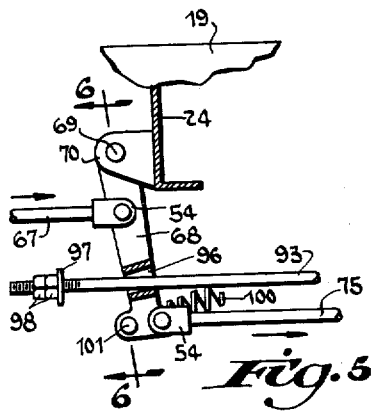
Figure 5 illustrates a portion of the brake linkage of Figure 4 in brake release position subject to operation by the service brake pedal, when the trailer is coupled to a tractor as shown in Figure 9.
Figure 6 is a sectional view taken on line 6—6 Figure 5, further illustrating the association of the parking brake release mechanism with the service brake linkage.
Figure 7:
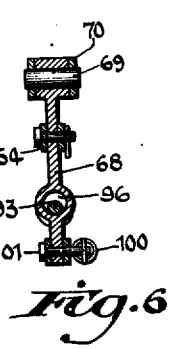
Figure 7 is an enlarged fragmentary sectional view of the brake release mechanism shown in Figure 4, further detailing the structure and relationship of the manual release lever.

As shown in Figure 4, the lever 68 is in braking position as automatically determined by the cam actuated lever 41 in uncoupling position. Should it be necessary for any reason to move the trailer when it is uncoupled and resting upon its prop 30, the automatic parking brake may be released by actuation of a hand lever provided for this purpose as part of brake release mechanism generally indicated at 85. The release mechanism is located beneath the chassis at a point midway of the length of the trailer and is manually operable to swing the lever 68 to brake release position.

As shown in Figures 3 to 7 inclusive, the apparatus comprises a bracket 86, generally of U-shape in cross section, secured by means of bolts 87 to the longitudinal sub-frame 19 of the chassis. It carries a manually operated release lever 88 pivotally mounted within the bracket at the forward end thereof on a pair of axially aligned pins 90 welded or otherwise secured to the bracket 86. The hand lever 88 includes bosses 91 (Figure 7) at respectively opposite sides thereof bored to receive the pins 90. The forward end of the hand lever is bifurcated as at 92 to receive the end of a pull rod 93, the rod having an eye 94 adapted to fit within the bifurcated portion of the hand lever and pivotally connected to it by means of a headed clevis pin 95 locked in place by a cotter pin 96 at its lower end.

The forward end of the pull rod 93 extends through an opening 96 in the lever 68 previously described. The extended forward end of the pull rod 93 includes a washer 97 and a pair of adjusting nuts 98 screw threaded thereon. The nuts and washer serve as an abutment or stop arranged to engage the forward edge of the lever 68 adjacent the opening 96 when the hand lever 88 is actuated to release the brakes. The lever 68 further includes a tension spring 100 having its forward end connected to a pin 101 and having its rearward end anchored upon a bracket 102 which is secured to the sub frame 10. This spring exerts a rearward pressure upon the lever 68 thereby tending to draw the brake pull rods and associated mechanism toward a retracted or brake release position.

Figure 3:
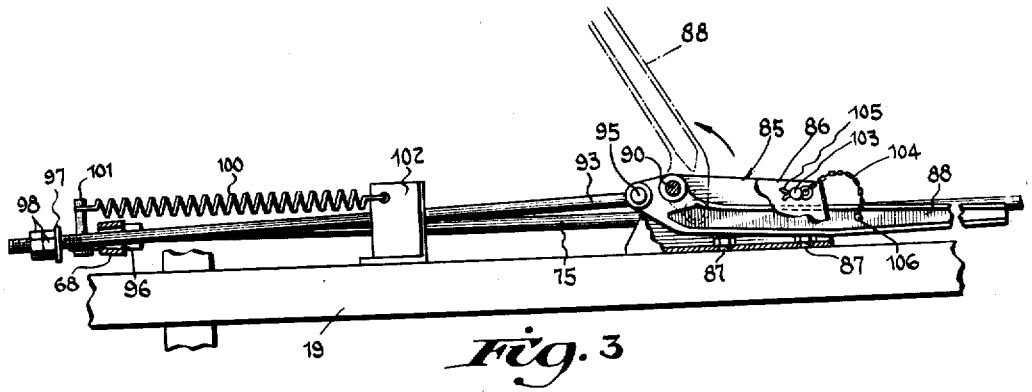
Figure 3 is an enlarged fragmentary plan view, partially in section, illustrating the parking brake release mechanism with its operating lever shown locked in normal position and in broken lines swinging toward brake release position.

Upon actuation of the hand lever 88 in the direction indicated in Figure 3, the lever fulcrums upon the pivot pins 90 and draws or retracts the pull rod 93 rearwardly until the washer 97 makes contact with the lever 68. Continued rearward movement of the pull rod draws the lever 68 rearwardly to the position shown in Figure 10 releasing the brakes. This rearward motion is also transmitted to the pull rod 67 through lever 66 to the cross shaft 58 and through the lever 55 to the pull rod 46. Rearward motion of the pull rod 46 is permitted by the spring 48 which compresses between the trunnion collar 47 at the rear and the adjusting nuts 52 secured on the forward end of the rod. The brake lever 41 thus remains in actuating position with its roller bearing against the coupler jaw cam although the brakes are released. In the complete brake release position, the hand lever 88 assumes the position shown in Figure 10, the pivot pin 95 being in a position slightly past dead center with respect to the pivot pin 90 thereby selflocking the hand lever in brake release position.

Since the parking brake release comes into use on relatively rare occasions, it is preferably latched in its normal or unoperative position by means of a locking pin 103 passing through holes drilled in the bracket 86 for this purpose. This pin may be protected against loss by means of the chain 104 secured to the cotter pin 105 which forms the head of the pin the opposite end of the chain being pinned to the hand lever as at 106. This locking pin, as shown, prevents actuation of the lever and, when it is desired to release the parking brakes, the pin is withdrawn from its position in the bracket.

When it is desired to uncouple the tractor from the trailer, the locking plungers 37 are withdrawn from the slots 36 of the coupling jaws preferably by the operation of the manually operated lever (not shown). This permits the jaws 33 to swing on their pivot pins as the king pin is withdrawn. The withdrawal of the king pin forces the lever 41 forwardly by reason of its association with the cam surface of the coupling jaw thereby automatically applying the parking brakes as shown in Figure 8.

When the trailer is coupled to the tractor, as shown in Figure 9, the parking brakes are automatically released and the same brake linkage serves for the operation of the service brakes. The service brakes are actuated from the cab in the usual manner by means of a brake pedal which in turn is connected to the pull rod 65, the brake motion being transmitted through the lever 63, thrust rod 61, to the lever 60 to the cross rod 58 as previously described. Rotation of the cross shaft, which is common to both braking systems, is transmitted to the brake linkage by means of the lever 66, pull rod 67, as previously described. When the service brakes are applied, the rotation of the cross rod moves the pull rod 46 forwardly and, consequently, the cam-operated brake lever 41 swings forwardly by reason of the engagement of the stop collar 53 against the rear edge of the lever.

It will be apparent, therefore, that the interconnection of the parking brake system with the coupling jaws does not interfere in any way with normal service operation of the brakes. Likewise, the manual release mechanism in its normal position, as shown in Figures 3 and 4, does not interfere with the operation of the service brakes.

The system as disclosed is applicable to either mechanical, or hydraulic brake systems without change in construction or design. In the event that it is applied to a hydraulic system, the pull rod 75 may be connected directly to the master cylinder of the braking system instead of the mechanical linkage to the brakes shown. In either instance, the operation of the brakes is automatic, the service brakes being operated in the usual manner by the service brake pedal in the cab and the parking brakes being automatically applied upon uncoupling.

The parking brake release mechanism is a separate unit and in no way interferes with the actuation of the main brake pull rod 75. Therefore, the addition of it to the brake system does not effect transfer of power transmitted from the service brake pedal to the brakes. Nor does it impart any looseness to the service brake linkage, since the release mechanism is not interposed in the system but is auxiliary to it. When the manual release lever is in inoperative position, the pull rod 95 merely slides through the lever 68 in the normal service braking movements of the rod 75.

Since the parking brake pressure is applied by compression of the spring 48, the adjusting nuts 52 control maximum brake set rather than directly controlling the degree of pull rod motion and braking pressure. This simplifies brake adjustment since less precision is required in setting. It also reduces the need of frequent parking brake adjustment due to wear since the compression spring, within limits, compensates for brake wear.

The action of the spring further provides a safety factor, tending to exert a constant braking pressure regardless of the condition of the brakes. For example, when the trailer is uncoupled and parked after having been in service, permitting the brake assembly to cool, the brakes tend to loosen due to contraction of the parts. This is counteracted by the compression spring and the initial braking pressure maintained, thereby preventing brake slippage.

The improved apparatus, by its automatic braking function, effects a saving in the time and effort of coupling and reduces wear and failure of the parts. The tractor need not couple by impact but may be backed into position gently since the trailer cannot roll back during the coupling motion, its brakes being set. Immediately upon being fully coupled the trailer brakes release automatically and the brake control is transferred to the tractor brake system for service operation by the driver.

Having described my invention, I claim:

1. In an automatic brake control system for semi-trailers and like vehicles having wheel brakes and having a coupling device for making a draft connection with a king pin carried by a tractor; means for connecting said system to said wheel brakes including resiliently connected elements, cam means associated with said coupling device, said cam means operatively connected to one of said resiliently connected elements to set the wheel brakes through the other of said connecting elements when the coupling device is opened to uncoupled position by withdrawal of the king pin.

2. In a semi-trailer having coupling means at its forward end and having a set of wheels and wheel brakes including brake control linkage at its rearward end; an automatic braking system for controlling said wheel brakes comprising, a movable coupling jaw in said coupling means, said jaw including a cam surface thereon, a cam lever associated with said cam surface and adapted to be actuated by movements of said coupling jaw, a pull rod, a compression spring disposed on said pull rod, said rod having an adjustable stop at one end thereof and said spring having one end seated against said stop and having its opposite end seated against said cam lever, and means connecting said pull rod to said brake control linkage whereby movement of the cam lever is transmitted through said spring to the brake control linkage to set the brakes when the coupling jaw is in uncoupled position.

3. An automatic brake control system for semi-trailers and like vehicles having wheel brakes and coupling means, comprising; brake control linkage operatively connected to said wheel brakes, a cam and a cam actuated lever associated with said coupling means, a spring element disposed between said cam actuated lever and said brake control linkage; said cam actuated lever arranged to apply pressure through said spring element to set the wheel brakes when the coupling means is in uncoupled position and, a manually operated brake release mechanism, said mechanism having a lever arranged to engage said brake control linkage and retract the same to brake release position by flexing said spring element.

4. A brake control system for semi-trailers and the like having wheel brakes and coupling means comprising; a coupling jaw, said jaw including a cam surface thereon, a cam lever, said lever associated with said cam surface and adapted to be actuated by movements of said coupling jaw; a compression spring, brake actuating means, said compression spring interposed between said cam lever and said brake actuating means and, a manual brake release mechanism, said release mechanism including a manually operated lever and a pull rod connected therewith, said pull rod having an abutment at one end thereof and said brake actuating means having a lever arranged to be engaged by said abutment to retract the lever and brake actuating means to brake release position by compressing said spring upon manual actuation of said lever.

5. In an automatic brake control system for semi-trailers and like vehicles having wheel brakes and having a coupling device for making a draft connection with a king pin carried by a tractor; a brake control system, said system having one end connected to said wheel brakes, and having its opposite end joined to a compressible connecting element, cam means associated with said coupling device, said cam means operatively connected to said compressible connecting element to set the wheel brakes when the coupling device is in uncoupled position and, manually actuated means operable to retract said brake control system to release the brakes by compressing said connecting element when the coupling device is in uncoupled position.

6. In a semi-trailer having coupling means at its forward end and having a set of wheels and wheel brakes including brake control linkage at its rearward end, an automatic braking system for controlling said wheel brakes comprising; a movable coupling jaw in said coupling means, said jaw including a cam surface thereon, a cam lever associated with said cam surface and adapted to be actuated by movements of said coupling jaw, a pull rod, said rod having one end connected to said cam lever and having its opposite end in operative connection with said brake control linkage whereby said brake control linkage is actuated to set the brakes when the coupling jaw is in uncoupling position and said linkage is actuated to release the brakes when the coupling jaw is in uncoupled position.

7. An automatic brake control system for semi-trailers and like vehicles having wheel brakes and coupling means for making a draft connection to a king pin carried by a tractor, comprising; a rotatable cross shaft, brake actuating linkage system connected respectively to said cross shaft and to said wheel brakes to apply the wheel brakes when said shaft is rotated, said coupling means having cam actuated spring connecting means associated therewith and connected with said shaft automatically to rotate the shaft to braking position when the coupling means is in uncoupled position, and a device carried by a tractor king pin and adapted to rotate the shaft and apply the brakes by actuation of a service brake system of a tractor when the coupling means is in draft connection with a tractor king pin.

8. In an automatic brake control system for semi-trailers and like vehicles having wheel brakes and a coupling device for making a draft connection with a king pin carried by a trailer; a brake control system for said wheel brakes, said system connected by a compressible connecting member to said coupling device and arranged automatically to set the wheel brakes when the coupling device is in uncoupled position, said brake control system having a retracting lever connected thereto, a hand operated brake release mechanism, said mechanism having a manually operated release lever, a pull rod connected to said lever, said pull rod traversing an opening in said retracting lever and having an abutment arranged to contact the retracting lever and actuate the same by compressing said connecting member to release the brakes upon manual operation of said release lever.

9. An automatic brake control system for semi-trailers and like vehicles having wheel brakes and coupling means for making a draft connection to a king pin carried by a tractor, comprising; a rotatable cross shaft, a brake actuating linkage system connected respectively to said cross shaft and to said wheel brakes to apply the wheel brakes when said shaft is rotated, said coupling means having cam actuated spring connecting means associated therewith and connected with said shaft automatically to rotate the shaft to braking position when the coupling means is in uncoupled position, a device carried by a tractor kin pin to rotate the shaft and apply the brakes by actuation of a service brake system of a tractor when the coupling means is in draft connection with a tractor king pin and, a manually operated brake release mechanism, said mechanism having a lever arranged to engage said brake actuating linkage and retract the same to brake release position by flexing said cam actuated spring connecting means to release the brakes when the coupling means is in uncoupled position.

10. In a tractor-trailer combination wherein the trailer includes rear wheels and brakes therefor and a forward end adapted to be supported on and coupled to the tractor; a coupling jaw on the trailer, a king pin on the tractor adapted to be engaged by the coupling jaw, a brake actuating rod extending to the brakes on the trailer, brake rod actuating means between said coupling jaw and said brake rod for setting the brakes when the jaw is uncoupled position, a spring disposed between the rod and the coupling jaw whereby the brakes are set through the spring, and service brake mechanism associated with the king pin and including a brake finger connected to the brake actuating rod.

11. In a tractor-trailer combination wherein the trailer includes rear wheels and brakes therefor and a forward end adapted to be supported on and coupled to the tractor; a coupling jaw on the trailer, a king pin on the tractor adapted to be engaged by the coupling jaw, a brake actuating rod extending to the brakes on the trailer, a brake rod actuating lever pivotally mounted adjacent said coupling jaw and engaging said brake rod, said lever including a part adapted to be engaged by the coupling jaw, and said coupling jaw including a cam portion for actuating the lever for fixing the brakes when the jaw is in uncoupled position.

12. In a tractor-trailer combination wherein the trailer includes rear wheels and brakes therefor and a forward end adapted to be supported on and coupled to the tractor; a coupling jaw on the trailer, a king pin on the tractor adapted to be engaged by the coupling jaw, a brake actuating rod extending to the brakes on the trailer, a brake rod actuating lever pivotally mounted adjacent said coupling jaw and including a part adapted to be engaged by the coupling jaw, said coupling jaw including a cam portion for actuating the lever for fixing the brakes when the jaw is in uncoupled position, and a spring disposed about the rod and between the head end of the rod and the lever whereby the brakes are set through the spring connection.

13. In a tractor-trailer combination wherein the trailer includes rear wheels and brakes therefor and a forward end adapted to be supported on and coupled to the tractor; a coupling jaw on the trailer, a king pin on the tractor adapted to be engaged by the coupling jaw, a brake actuating rod extending from the front end of the trailer to the brakes on the trailer, a brake rod actuating lever pivotally mounted adjacent said coupling jaw and including a part adapted to be engaged by the coupling jaw, said coupling jaw including a cam portion for actuating the lever for fixing the brakes when the jaw is in uncoupled position, a spring disposed about the rod and between the head end of the rod and the lever whereby the brakes are set through the spring, said rod being in sections, a swinging arm pivotally mounted on the trailer, one of said sections pivotally attached to an intermediate portion of the arm and the other section attached to the outer end of the arm, a manually operated release mechanism for releasing said brake by pulling said rod against the pressure of the spring, said brake release mechanism consisting of a rod translatably mounted through the arm and including a head adapted to engage the arm and, a brake release lever for translating said rod.

14. In a tractor-trailer combination wherein the trailer includes rear wheels and brakes therefor and a forward end adapted to be supported on and coupled to the tractor; a coupling jaw on the trailer, a king pin on the tractor adapted to be engaged by the coupling jaw, a brake actuating rod extending to the brakes on the trailer, a brake rod actuating lever pivotally mounted adjacent said coupling jaw and including a part adapted to be engaged by the coupling jaw, said coupling jaw including a cam portion for actuating the lever for fixing the brakes when the jaw is in uncoupled position, and a spring disposed about the rod and between the head end of the rod and the lever whereby the brakes are set through the spring connection, and a manually operated release mechanism for releasing said brake constructed and arranged so as to pull said rod against the pressure of the spring.

15. In a tractor-trailer combination including a trailer having rear wheels thereon, brakes for the wheels, and a forward end adapted to be supported and attached to the tractor; a coupling jaw adapted to engage a part in the tractor for coupling the trailer thereto, brake operating linkage extending from the coupling jaw to the trailer brakes, said coupling jaw adapted to be swung in its opening and closing movements and including a cam surface, lever means interposed between the coupling jaw and the brake operating linkage for operating the linkage through the medium of the cam surface to set the brakes when the coupling jaw is swung to open position, said brake operating linkage including a compressible connection to said lever means, and a manually operable release means in the brake operating linkage for releasing the brakes independently of the lever means and as permitted by compression of said compressible connection.

JAMES J. BLACK.

REFERENCES CITED

The following references are of record in the file of this patent:

UNITED STATES PATENTS

| Number | Name | Date |
|---|---|---|
| 1,944,773 | Winn | Jan. 23, 1934 |
| 2,179,708 | Bock | Nov. 14, 1939 |
| 2,277,179 | Winn | Mar. 24, 1942 |